June 2, 1931.   W. W. FIRMAN   1,808,133
POTATO HARVESTER
Filed Dec. 6, 1929   5 Sheets-Sheet 1
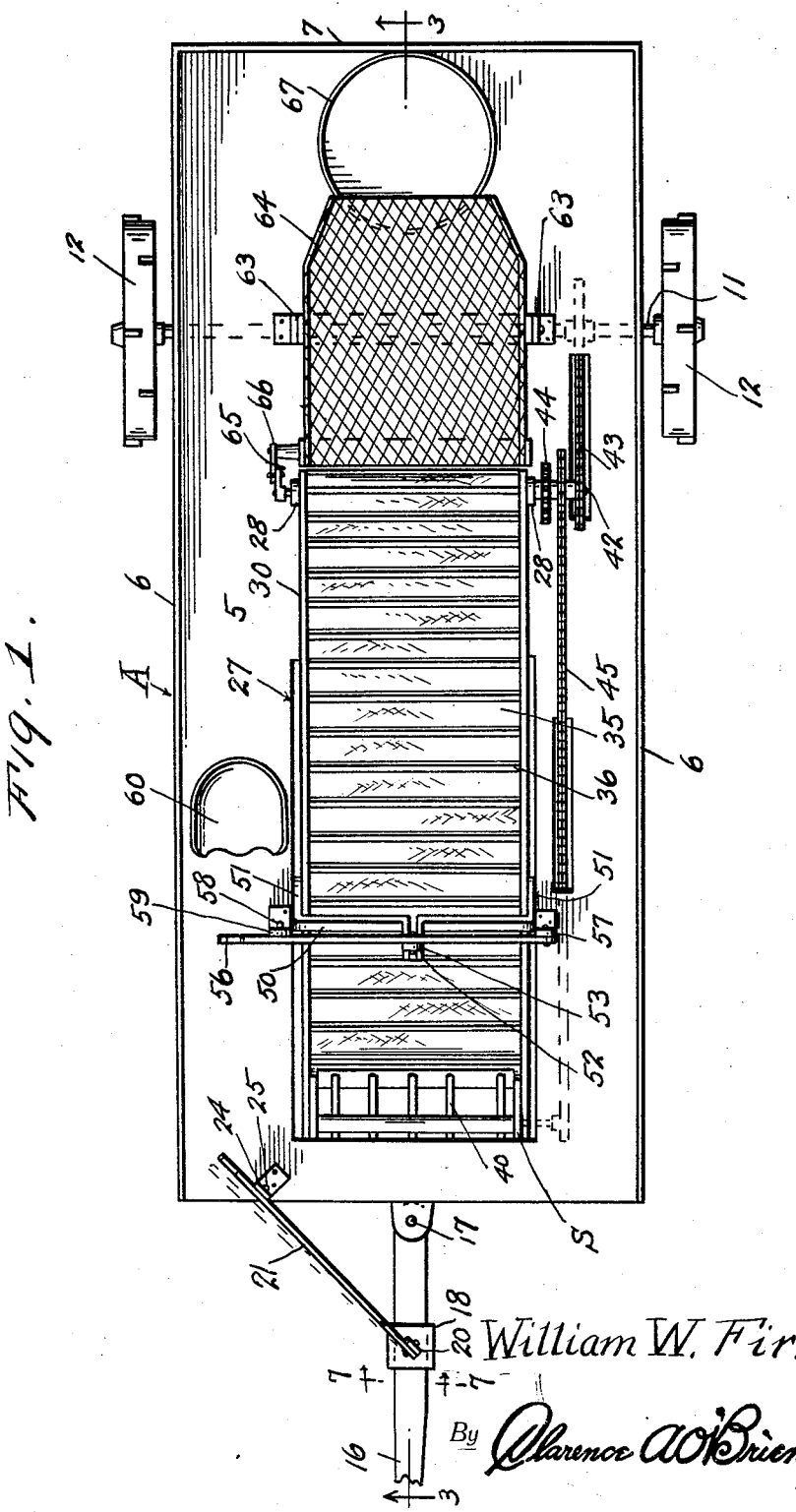
Inventor
William W. Firman
By Clarence A. O'Brien
Attorney

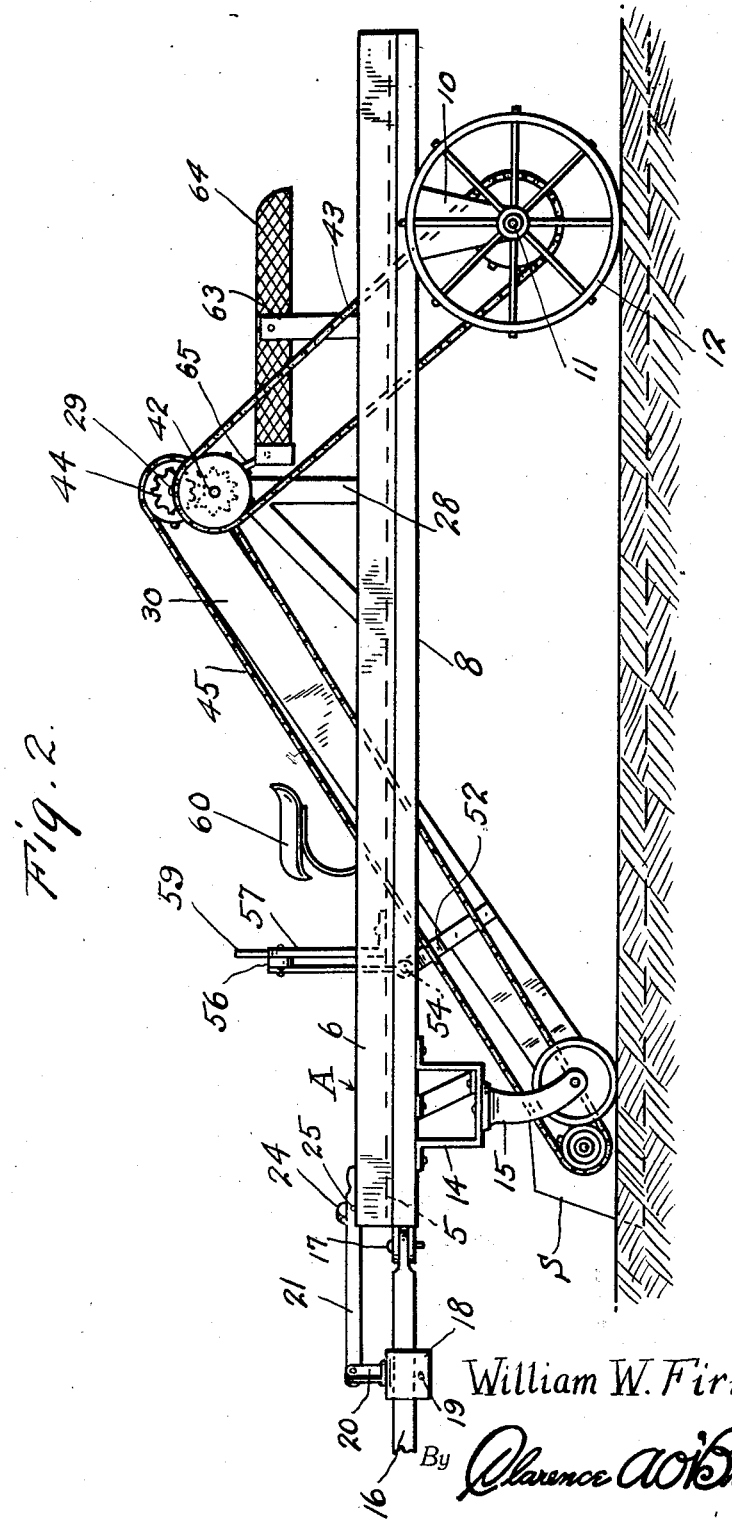

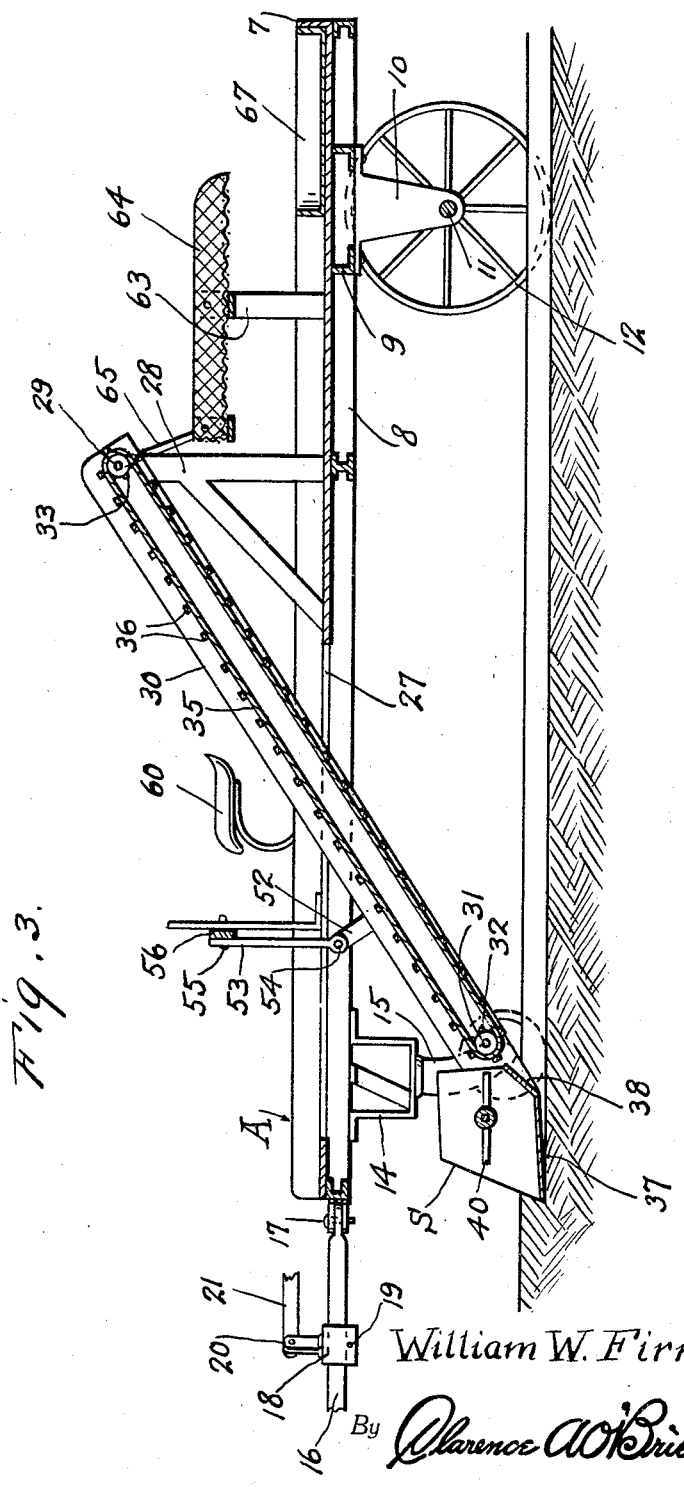

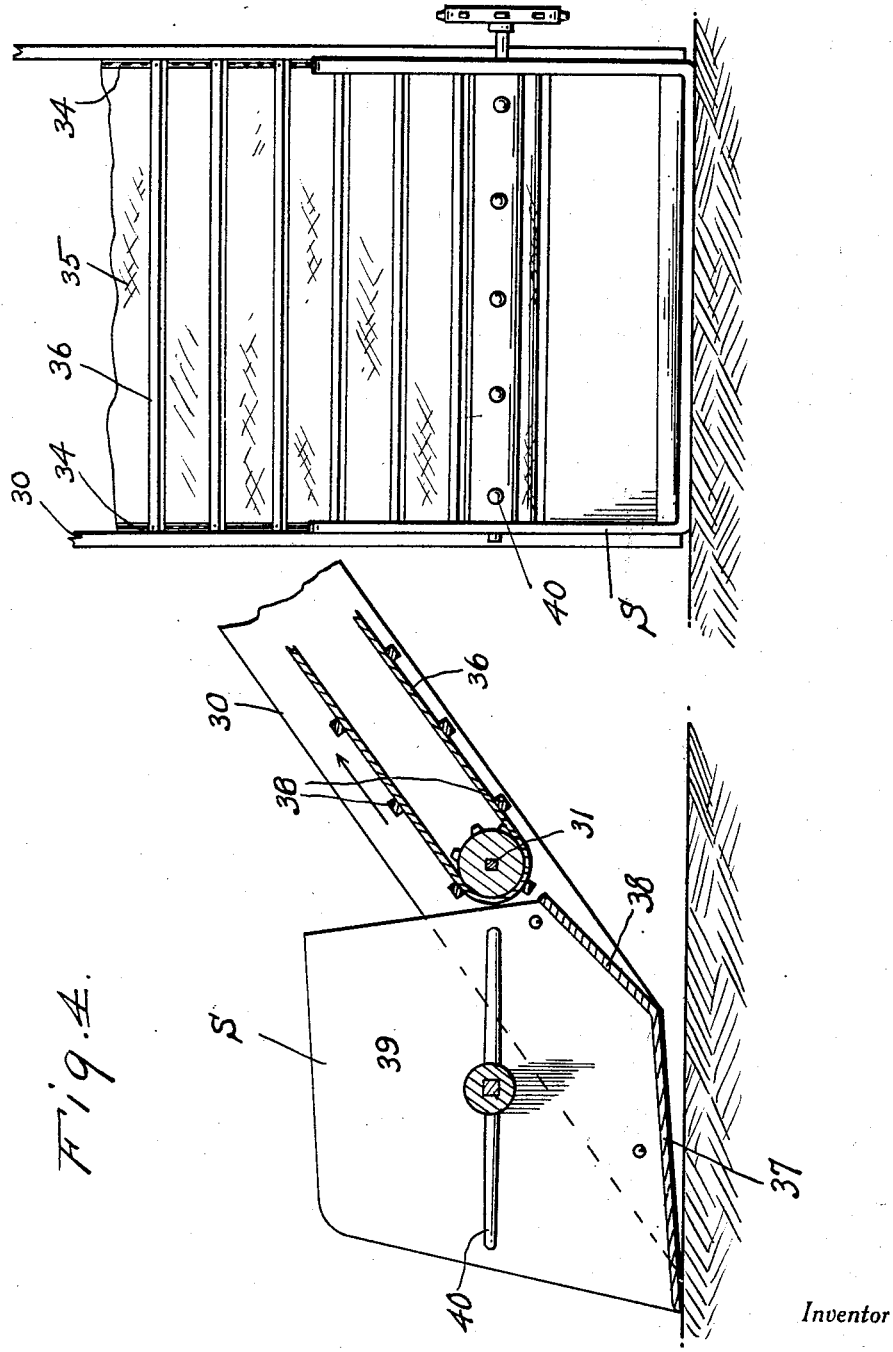

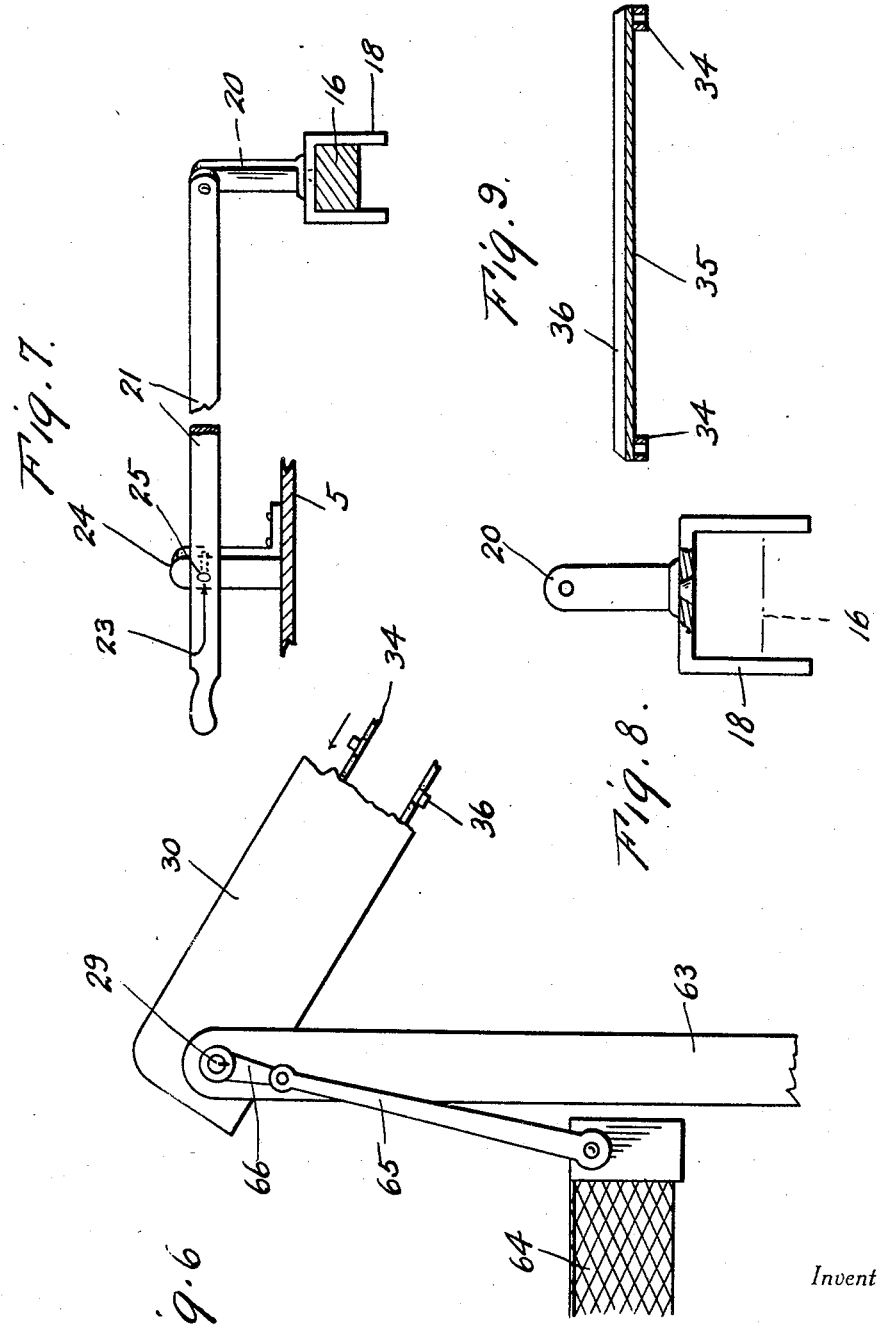

Patented June 2, 1931

1,808,133

UNITED STATES PATENT OFFICE

WILLIAM W. FIRMAN, OF DETROIT, MICHIGAN

POTATO HARVESTER

Application filed December 6, 1929. Serial No. 412,099.

The present invention relates to a potato harvester and has for its prime object to provide a wheeled apparatus with means for digging potatoes from the ground and elevating them up into a screen shaker from which they may be deposited in crates or suitable receptacles.

Another very important object of the invention resides in the provision of a potato harvester of this nature with means whereby the elevator and digging means may be easily adjusted and controlled.

A still further very important object of the invention resides in the provision of a potato harvester of this nature which is comparatively simple in its construction, inexpensive to operate, strong and durable, compact and convenient in its arrangement of parts, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is a top plan view of the potato harvester embodying the features of my invention, Figure 2 is a side elevation thereof, Figure 3 is a vertical longitudinal section therethrough, Figure 4 is an enlarged detail vertical section through the scoop, Figure 5 is an enlarged detail front elevation of the scoop, Figure 6 is an enlarged detail side elevation showing the upper end of the elevator and the adjacent end of the shaker screen, Figure 7 is a detail section through the tongue taken substantially on the line 7—7, Figure 8 is a detail sectional view of the bracket for the tongue, and Figure 9 is a sectional view through the endless conveyor.

Referring to the drawings in detail it will be seen that the letter A denotes generally a body comprising a bottom 5 with side walls 6 and rear wall 7. This body A is supported on a channel iron frame 8 with a pair of iron cross bars 9 in the rear portion thereof from which depend standards 10 in the lower ends of which are journaled an axle shaft 11.

Wheels 12 are fixed on the ends of this axle shaft. Brackets 14 depend from the front portions of the sides of the frame 8 and have casters 15 connected thereto. A tongue 16 is pivotally engaged as at 17 with the front of the frame 8.

An inverted U-shaped casting 18 is adapted to straddle an intermediate portion of the tongue 16 and held in place by a cross pin 19. A bracket 20 rises from the top of the casting 18 and has a lever 21 pivoted thereto. A pin 23 extends laterally from a bracket or standard 24 rising from the front of the bottom 5 to engage in an opening 25 formed in the lever 21.

This lever 21 is resilient and may be sprung to the dotted line position shown in Figure 1 to free itself from the pin 23 so as to allow movement of the tongue.

When it is desired that the draft animals pull the apparatus straight ahead, the lever is engaged with the pin thus rigidly holding the tongue 16 with respect to the body.

An elongated rectangular opening 27 is formed longitudinally in the front portion of the bottom 5. Standards 28 rise from the bottom 5 to the rear of the opening 27 and have a shaft 29 journaled in their upper ends. Elevator frame sides 30 are rockable on the shaft 29 and extend down through the opening 27.

A shaft 31 is journaled between the lower ends of the sides 30. Sprockets 32 and 33 are mounted on the shafts 31 and 29 respectively and have trained thereover endless chains 34 on which is fixed an endless belt 35 having cross cleats 36 on the outside thereof.

Between the bottom ends of the sides 30 is fixed a scoop S comprising a bottom blade 37 the rear end of which extends upwardly and rearwardly at an acute angle indicated at 38. Side plates 39 rise from the blade 37 and a beater structure 40 is journaled between the side plates. A stub shaft 42 is journaled on one of the standards 28 and is operatively connected with the axle shaft 11 by a chain and sprocket mechanism 43. Gearing 44 operatively connects the shaft 42 with the shaft 29. A chain and sprocket mechanism 45 operatively connects the shaft 29 with the beater 40 and rotates it counter clockwise so that the potatoes are separated from the dirt and thrown onto the elevator.

It will therefore readily be seen that when the machine moves forwardly thus turning the rear axle counter clockwise as in Fig. 2, it causes the operation of the endless elevator and the beater in clockwise direction, so that potatoes scooped up on to the lower end of the elevator will be brought by the elevator up through the openings 27.

In order to raise and lower the elevator and the scoop I provide a pair of brackets 50 having ears 51 rockably engaged with the sides 30 adjacent their lower ends so that the brackets 50 extend inwardly across the endless elevator and terminate in upwardly directed ears 52 with which the lower end of the link 53 is pivotally engaged as at 54. The upper end of this link 53 is pivotally engaged as at 55 with a lever 56 rockably mounted on a standard 57 rising from the bottom 5 and the free end provided with a pin 58 to extend through openings in another standard 59 rising from the bottom.

One standard 57 is located to one side of the opening 27 while the other standard 59 is located to the other side thereof as will be clearly seen in Figure 1. The driver's seat 60 is located on the bottom at the rear of the standard 59 so that this lever 56 may be conveniently controlled.

Brackets 63 rising from the rear portion of the bottom 5 rockably support a shaker screen 64. A connecting rod 65 is pivotally engaged with the front end of the shaker screen which is pivotally engaged with a crank 66 on the shaft 29 so that as this shaft 29 rotates the shaker screen is oscillated and will cause all the dirt to be shaken from the potatoes and cause the potatoes to drop into a receptacle mounted in the container 67 at the rear end of the bottom.

It is thought that the construction, operation, utility and advantages of this invention will now be quite apparent to those skilled in this art without a more detailed description thereof.

The present embodiment of the invention has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In a potato harvester of the class described, a wheeled frame, an elevator mechanism mounted in the frame, means for raising and lowering the elevator mechanism, a scoop on the lower end of the elevator mechanism, a beater in the scoop, a shaker screen at the rear end of the elevator, means for rockably mounting the shaker screen, means operatively connecting the elevator with the wheels of the wheel frame, means operatively connecting the elevator with the beater and means operatively connecting the elevator with the shaker screen, said beater being rotated in a direction opposite to that of the ground wheels for separating the potatoes from the dirt and throwing them onto the elevator.

2. Draft means for a potato harvester for insuring the straight ahead progress thereof comprising a tongue pivotally engaging with the front end of the frame, a lever, means for pivotally engaging the lever with an intermediate portion of the tongue, a standard rising from the frame, and having a lateral pin adapted to engage in an opening in the lever.

3. In an apparatus of the class described, a wheeled frame, an elevator mechanism, means for rockably mounting the upper end of the elevator mechanism, brackets engaged with the sides of the elevator mechanism and meeting over and adjacent the lower end thereof, a link engaged with the inner sides of the brackets, a pair of standards rising from the side portions of the frame, a lever pivoted on one of the standards, said link being pivotally engaged with an intermediate portion of the lever, and means on the lever for engaging the other standard to hold the lever against displacement from adjusted position after the elevator has been raised or lowered.

4. In an apparatus of the class described, a wheeled frame, an elevator mechanism, means for rockably mounting the upper end of the elevator mechanism, brackets engaged with the sides of the elevator mechanism and meeting over and adjacent to the lower end thereof, a link engaged with the inner end of the brackets, a pair of standards rising from the side portions of the frame, a lever pivoted on one of the standards, said link being pivotally engaged with an intermediate portion of the lever, and means on the lever for engaging the other standard to hold the lever in adjusted position after the elevator has been raised or lowered, a scoop on the lower end of the elevator.

In testimony whereof I affix my signature.

WILLIAM W. FIRMAN.